(12) United States Patent  
Kumar

(10) Patent No.: US 8,261,201 B2  
(45) Date of Patent: Sep. 4, 2012

(54) SPECTRUM BAR CONTROL

(75) Inventor: Jyoti Kumar, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 971 days.

(21) Appl. No.: 12/035,590

(22) Filed: Feb. 22, 2008

(65) Prior Publication Data

US 2009/0217181 A1 Aug. 27, 2009

(51) Int. Cl.
G06F 3/048 (2006.01)
G06F 7/00 (2006.01)
G06F 12/00 (2006.01)
G09G 5/022 (2006.01)

(52) U.S. Cl. ............ 715/764; 715/853; 345/440.2; 707/741; 707/825

(58) Field of Classification Search .......... 707/603, 707/741, 825; 715/968, 764, 853; 345/440.2
See application file for complete search history.

(56) References Cited

U.S. PATENT DOCUMENTS

| 5,632,009 | A | 5/1997 | Rao et al. | |
|---|---|---|---|---|
| 5,960,451 | A * | 9/1999 | Voigt et al. | 711/114 |
| 6,097,399 | A * | 8/2000 | Bhatt et al. | 345/440 |
| 6,463,431 | B1 | 10/2002 | Schmitt | |
| 6,628,205 | B2 * | 9/2003 | Aguren et al. | 340/815.4 |
| 6,707,454 | B1 | 3/2004 | Barg et al. | |
| 7,031,988 | B2 * | 4/2006 | Kusama et al. | 707/823 |
| 7,555,719 | B1 * | 6/2009 | Yehuda et al. | 715/736 |
| 7,567,250 | B2 * | 7/2009 | Hao et al. | 345/440 |
| 7,587,568 | B2 * | 9/2009 | Muthulingam et al. | 711/165 |
| 7,779,344 | B1 * | 8/2010 | Hao et al. | 715/215 |
| 7,877,698 | B1 * | 1/2011 | Woodings et al. | 715/764 |
| 7,924,283 | B1 * | 4/2011 | Hao et al. | 345/440 |
| 2002/0180795 | A1 * | 12/2002 | Wright | 345/772 |
| 2003/0071815 | A1 * | 4/2003 | Hao et al. | 345/440 |
| 2004/0080536 | A1 | 4/2004 | Yakhini et al. | |
| 2004/0169688 | A1 | 9/2004 | Burdick et al. | |
| 2004/0205450 | A1 * | 10/2004 | Hao et al. | 715/500 |
| 2005/0177598 | A1 | 8/2005 | Hao et al. | |
| 2006/0090130 | A1 | 4/2006 | Bent et al. | |
| 2007/0050206 | A1 | 3/2007 | Whikehart et al. | |
| 2008/0270933 | A1 * | 10/2008 | Straw et al. | 715/781 |

OTHER PUBLICATIONS

SpaceMonger v2.1.1, release Sep. 8, 2006, http://www.sixty-five.cc/download.*
FolderSizes, Oct. 11, 2007, http://waybackmachine.org/200710110136613/http://foldersizes.com/index.htm.*
Oellien, "InfVis Applet Manual", retrieved from <http://www2.chemie.uni-erlangen.de/research/information_visualization/doc/index.html>, downloaded on Dec. 12, 2007, 21 pages.
Coram, et al., "Experiences—A Pattern Language for User Interface Design", retrieved from <http://www.maplefish.com/todd/papers/Experiences.html>, downloaded on Dec. 12, 2007, 16 pages.
Weber; et al., "Visualizing Time-Series on Spirals", Proceedings of the IEEE Symposium on Information Visualization Oct. 22-23, 2001 (INFOVIS'01), pp. 1-7.

* cited by examiner

Primary Examiner — Tadeese Hailu
Assistant Examiner — Nicholas Ulrich

(57) ABSTRACT

Various technologies and techniques are disclosed for providing a graphical user interface control in a spectrum bar. The spectrum bar control is operable to switch between a statistical view of data and a discrete view of the data while maintaining a same size of the graphical user interface control. The spectrum bar control is operable to display data for multiple data elements, with different colors being used to represent different categories of the data elements. The spectrum bar control also enables three or more dimensions of data to be displayed in a small space.

19 Claims, 16 Drawing Sheets

260 ↘

┌─────────────────────────────────────────────────────────────┐
│ ALLOW USER TO CUSTOMIZE COLORS DISPLAYED IN SPECTRUM        │
│ BAR CONTROL FOR DATA ELEMENT CATEGORIES                     │
│ 262                                                         │
└─────────────────────────────────────────────────────────────┘
                              ↓
┌─────────────────────────────────────────────────────────────┐
│ ALLOW USER TO SPECIFY FILTER CRITERIA FOR FILTERING WHAT    │
│ DATA ELEMENTS SHOULD BE INCLUDED IN SPECTRUM BAR            │
│ CONTROL                                                     │
│ 264                                                         │
└─────────────────────────────────────────────────────────────┘
                              ↓
┌─────────────────────────────────────────────────────────────┐
│ ALLOW USER TO SPECIFY SORT CRITERIA THAT IS USED TO SORT    │
│ DATA ELEMENTS DISPLAYED IN SPECTRUM BAR CONTROL             │
│ 266                                                         │
└─────────────────────────────────────────────────────────────┘

FIG. 9

SPECTRUM BAR CONTROL

BACKGROUND

Computers that run computer software enable people to view and interact with data in an electronic format. Software developers create computer software using one or more software development programs. An appropriate graphical user interface control is usually chosen by the software developer for displaying or managing the particular type(s) of data offered by the software. For example, a text box control might be used for enabling the user to enter or view a name or address. A comment control might be used for enabling the user to enter a more lengthy comment. A label control might be used to display data that cannot be edited, but that is informational in nature. Each control usually has specific features that it supports, and thus each control is usually best suited for a specific purpose.

When an amount of data to be accessed by users is small, they are typically interested in seeing the individual data attributes. For example, if there are just three records being accessed, the user most likely wants to see the individual data attributes related to the three records since there are so few records. If there are 50,000 records, on the other hand, then the user would not likely want to see the individual data attributes about every single one of the 50,000 records. Instead, the user would more likely be interested in knowing more about the statistical nature of the data, such as how many start with the letter A, how many start with the letter B, and so on.

A typical user interface control is not able to show these two extremes of data display. In other words, controls are typically designed to show data at an individual attribute level, or the control is designed to show data at a statistical level. When a large volume of data and/or multiple dimensions are involved, complex user interface designs are typically used to display the data. These complex user interface designs can take the developer a lot of time to design, and can also make the data difficult for the user to understand.

SUMMARY

Various technologies and techniques are disclosed for providing a graphical user interface control in a spectrum bar. The graphical user interface control is operable to switch between a statistical view of data and a discrete view of the data while maintaining a same size of the graphical user interface control. The control is operable to display data in the spectrum bar for multiple data elements, with different colors being used to represent different categories of the data elements.

In one implementation, the spectrum bar control also enables three or more dimensions of data to be displayed in a small space. For example, a first dimension of the data elements can be visually represented by different colors used for each category of the data elements. A second dimension of the data elements can be visually represented by a position of the data elements within the spectrum bar control. A third onward dimension of the data elements can be visually represented by a physical size of the data elements as shown in the spectrum bar control as a bar chart.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 is a process flow diagram for one implementation that illustrates the stages involved in allowing a user to customize how a spectrum bar control displays data.

DETAILED DESCRIPTION

The technologies and techniques herein may be described in the general context as a graphical user interface control, but the technologies and techniques also serve other purposes in addition to these. In one implementation, one or more of the techniques described herein can be implemented as features within any type of program or service that uses graphical user interface controls to display data.

In one implementation, a spectrum bar control is provided that is operable to switch between a statistical view of data and a discrete view of the data while maintaining the same size. The spectrum bar control can also show multiple dimensions of data in a small amount of space. The term "spectrum bar" as used herein is meant to include a graphical user interface control that displays data in a spectrum of colors in a bar format (horizontal as well as vertical) where different colors represent different kinds of data elements. The term "data element" as used herein is meant to include an individual data item being represented on a spectrum bar control, whether that item is representing a statistical unit of the data or a discrete unit of data.

Figure 1:
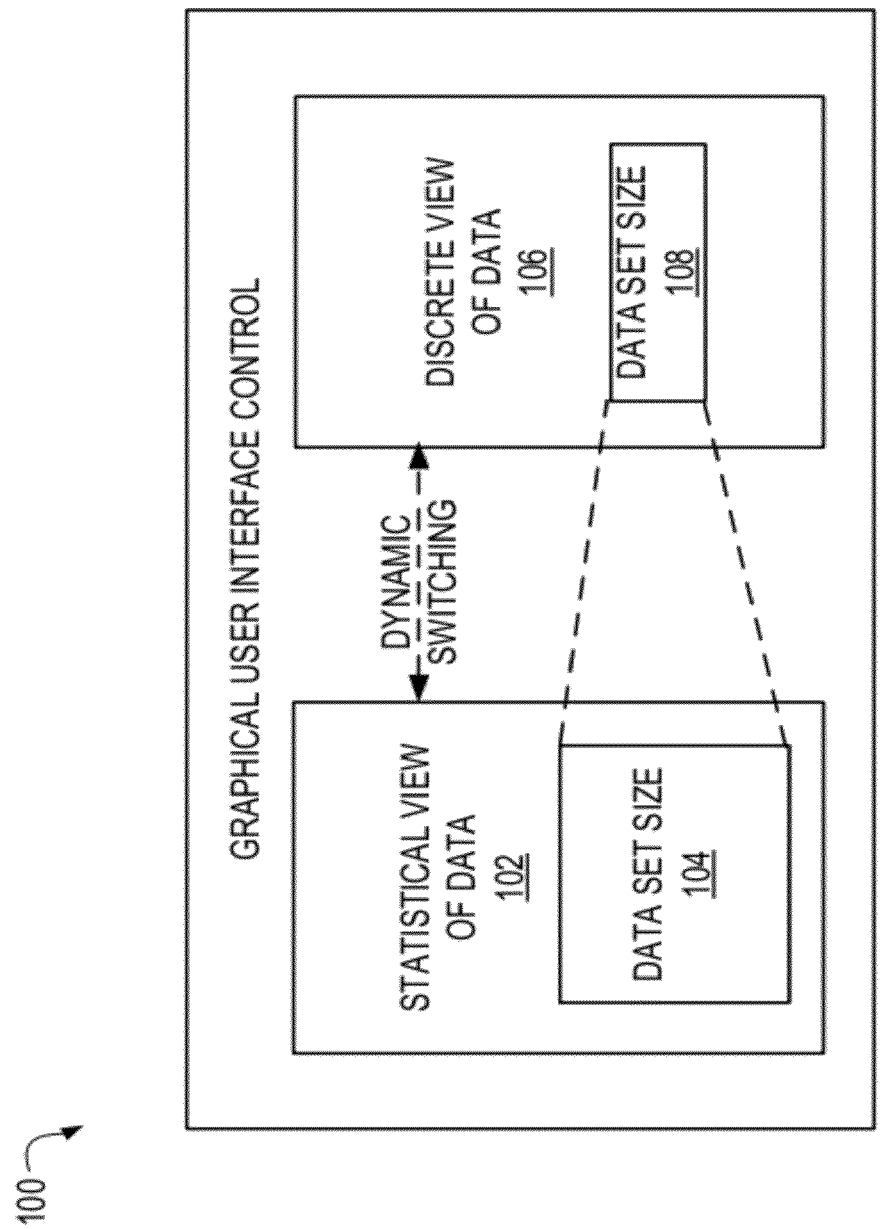
FIG. 1 is a diagrammatic view that illustrates dynamically switching between a statistical view of data and a discrete view of data in a graphical user interface control based upon a size of the data sets.

FIG. 1 is a diagrammatic view 100 that illustrates dynamically switching between a statistical view of data and a discrete view of data in a graphical user interface control based upon the size of the data sets being represented in the control. When the data set size is larger 104 than can be reasonably understood by a human viewing the data elements as individual units, then the control dynamically switches to a statistical view of the data 102. The term "statistical view of data" as used herein is meant to include a view of data that shows the overall characteristics of the data when considered with other data in a data set. As described in further detail in FIG. 4, when the statistical view of data 102 is being used in the spectrum band because the data set size is larger 104, then the data is shown in a compressed width for each individual data element. When the data set size is small enough 108 to represent as individual data elements, then the control dynamically switches to a discrete view of the data 106. The term "discrete view of data" as used herein is meant to include a view of data that shows individual data elements represented as a rectangular box and distinctly separated by some gap space. This dynamic toggling between the statistical view of the data and the discrete view of data based on data set size is described in further detail in FIGS. 2-4, which will be discussed next.

Turning now to FIGS. 2-16, technologies and techniques for implementing one or more implementations of spectrum bar control 100 are described in further detail. In some implementations, the processes and/or techniques of FIG. 2-16 are at least partially implemented in the operating logic of computing device 500 (of FIG. 17).

Figure 2:
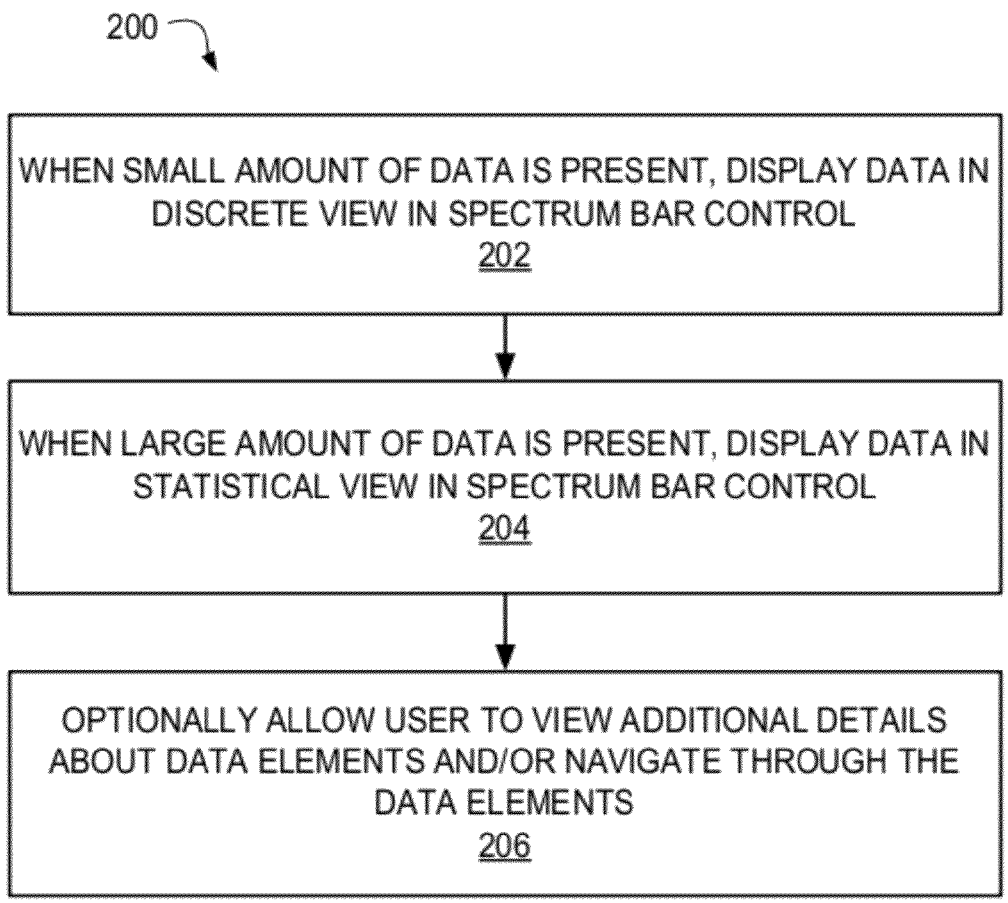
FIG. 2 is a process flow diagram for one implementation illustrating the high level stages involved in interacting with a spectrum bar control.

FIG. 2 is a process flow diagram 200 for one implementation illustrating the high level stages involved in interacting with a spectrum bar control. When a small amount of data is present in a data set being displayed in the spectrum bar control, then the data is displayed in a discrete view (stage 202) where individual data elements are represented. A discrete view of data is illustrated in further detail in FIG. 3. When a large amount of data is present in a data set being displayed in the spectrum bar control, then the data is displayed in a statistical view where the statistical nature of the data is represented in the data elements being displayed (stage 204). The term "large amount of data" means a size of the data set being displayed that is so big that a normal human mind cannot comprehend each data property individually. In one implementation, what constitutes a large amount of data is determined programmatically using one or more calculations. In another implementation, a user-definable setting can be specified to allow the user to control how large a data set should be before a statistical view of the data should be presented instead of a discrete view. A statistical view of data is illustrated in further detail in FIG. 4. The user can optionally view additional details about the data elements and/or navigate through the data elements (stage 206), as shown in further detail in FIG. 5, FIG. 6, and other figures herein.

Figure 3:
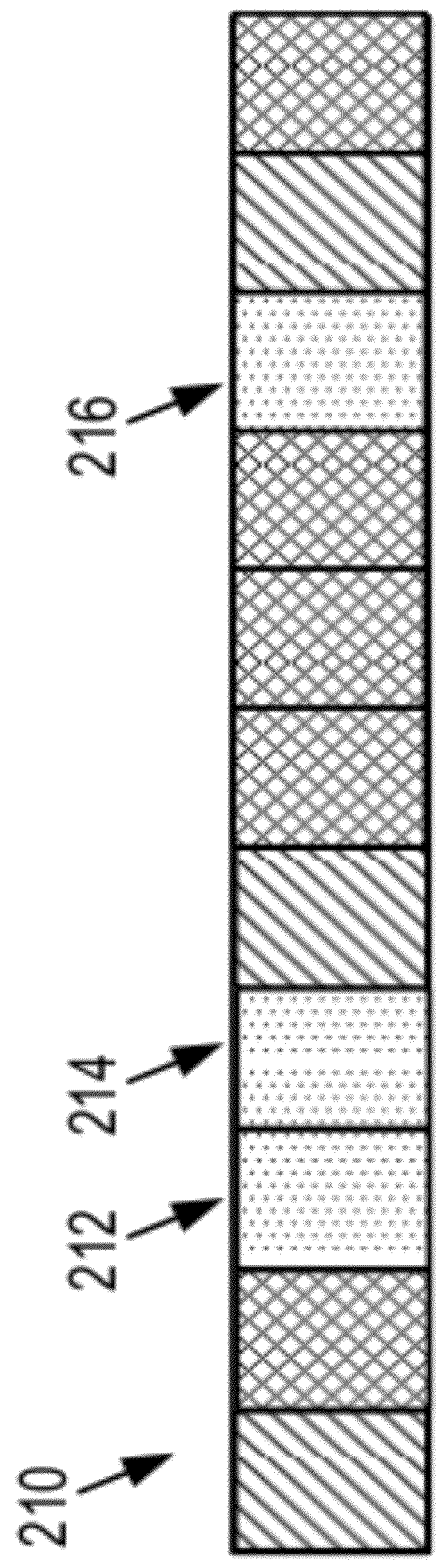
FIG. 3 is a diagrammatic view for one implementation illustrating a spectrum bar control in a discrete view for showing a few data elements.

FIG. 3 is a diagrammatic view for one implementation illustrating a spectrum bar control 210 in a discrete view with just a few data elements. This is an example of how a spectrum bar control 210 can appear when a discrete view of the data is displayed. Colors are represented in the figures herein, including FIG. 3, by using different shadings and crosshatches. In the example spectrum bar in FIG. 3, there are just a few data elements being represented. For example, suppose the control is being used to represent compact discs that are contained in a music collection. Items 212, 214, and 216 may represent compact discs that are in the collection by the same artist. The other items shown in the control are from other artists. Since just a few data elements are present in the data set, each discrete unit of data is being displayed on the control. In this example, the discrete unit of data is artist, and each artist is shown with a unique color. Another dimension of the data being represented could be the position of the compact disc in the CD changer. This position could correlate to the position of the data elements being displayed on the screen in the spectrum bar.

Additional details about each data element can optionally be viewed, such as by hovering an input device over a particular data element. Additional details about each artist could include album title, release date, etc. The displaying of additional details is discussed further in FIG. 6 and some other figures herein. An example spectrum bar in a statistical view will now be shown in FIG. 4 to illustrate how the view can change when there is a large data set to represent in the control.

Figure 4:
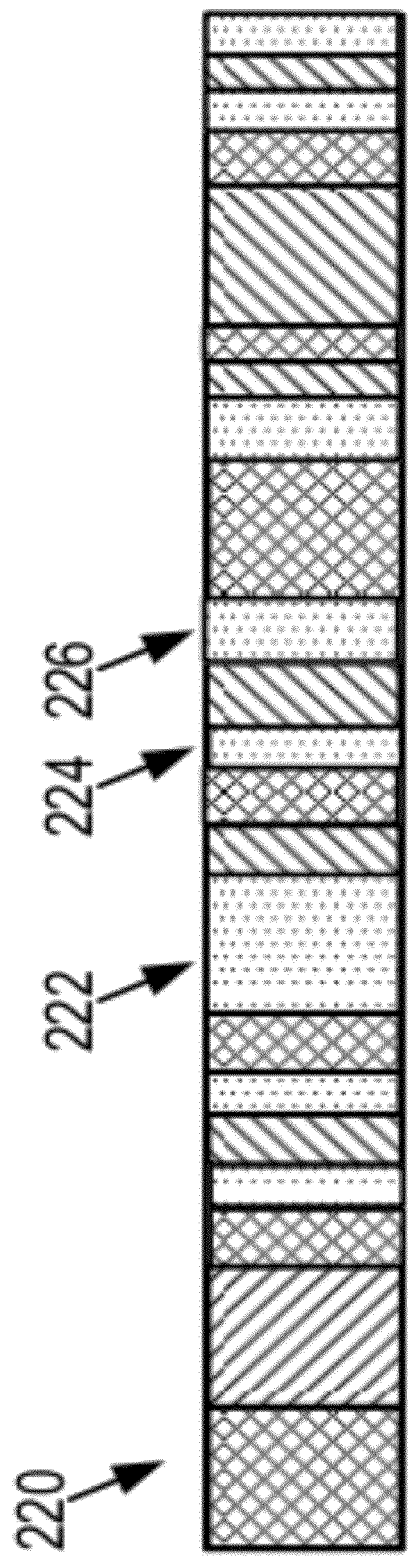
FIG. 4 is a diagrammatic view for one implementation illustrating a spectrum bar control in a statistical view for representing a large number of data elements.

FIG. 4 is a diagrammatic view for one implementation illustrating a spectrum bar control 220 in a statistical view for representing large data elements. In the example shown in FIG. 4, a larger data set needs to be represented in the control. Thus, instead of displaying each data element individually (represented as a separated rectangular box), the statistical nature of the data is displayed in the control in a compressed width. The compressed width is shown for each individual data to make it look like a spectrum and so the width of each kind of color or frequency of the color pattern gives an idea about the presence of the individual kind of data.

The example shown in FIG. 4 represents three dimensions of the data. In this hypothetical example, the first dimension of the data elements is visually represented by different colors used for each category of the data elements. The second dimension of the data elements is visually represented by a position of the data elements within the spectrum bar control. The third dimension of the data elements is visually represented by a physical size of the data elements as shown in the spectrum bar control. Fewer than three or greater than three dimensions could also be represented in the spectrum bar control in other implementations. In case of the music library example introduced earlier, a different color may represent a different artist. The display order on the bar may represent the songs in chronological order of time. The bar chart as a third dimension may represent the length of song, song data size, etc.

Figure 5:
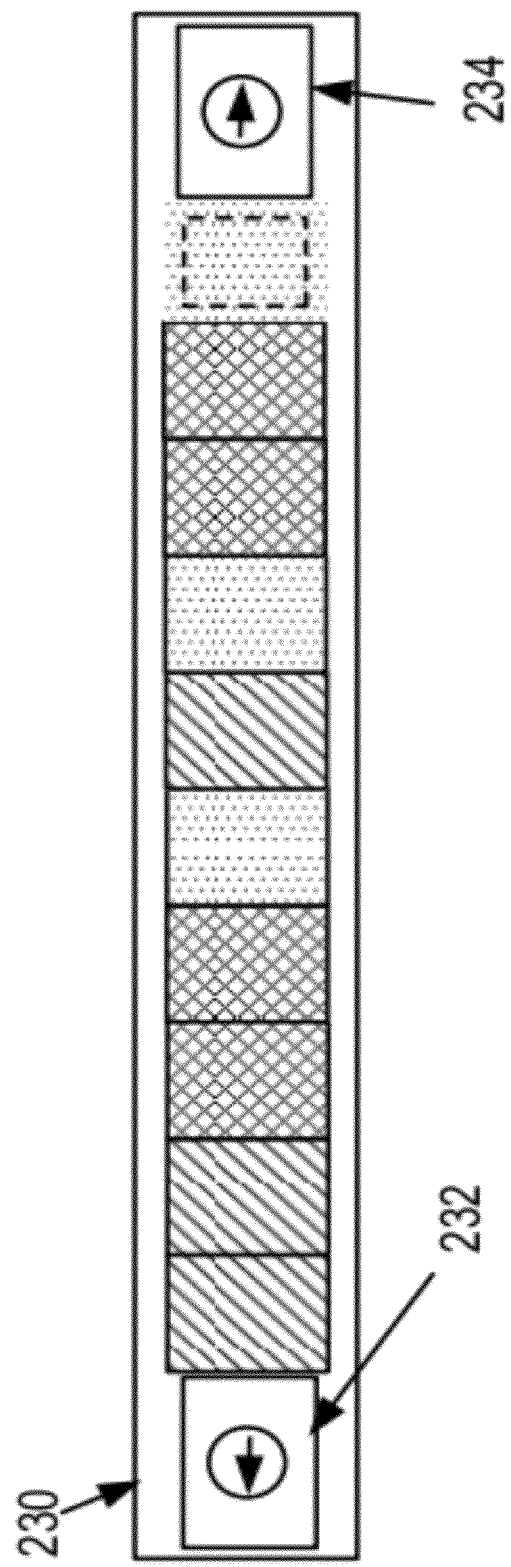
FIG. 5 is a diagrammatic view for one implementation illustrating a spectrum bar control with large data elements in a navigation mode.

Turning now to FIG. 5, a diagrammatic view for one implementation is shown that illustrates a spectrum bar control 230 with large data elements in a navigation mode. Even when the user is viewing data in the statistical view, they can switch to a navigation mode to look at the more discrete data elements. In navigation mode, navigation options 232 and 234 are displayed to enable the user to navigate through the data elements being displayed. The user can optionally launch actions associated with the data elements in the control, as is described in further detail in FIG. 15. Additional details can also be viewed about a selected one or more of the data elements, such as in a tool tip, in a separate window, underneath the control, etc. An example of a tool tip for displaying additional information about a selected data element is shown in more detail in FIG. 6, which is discussed next.

Figure 6:
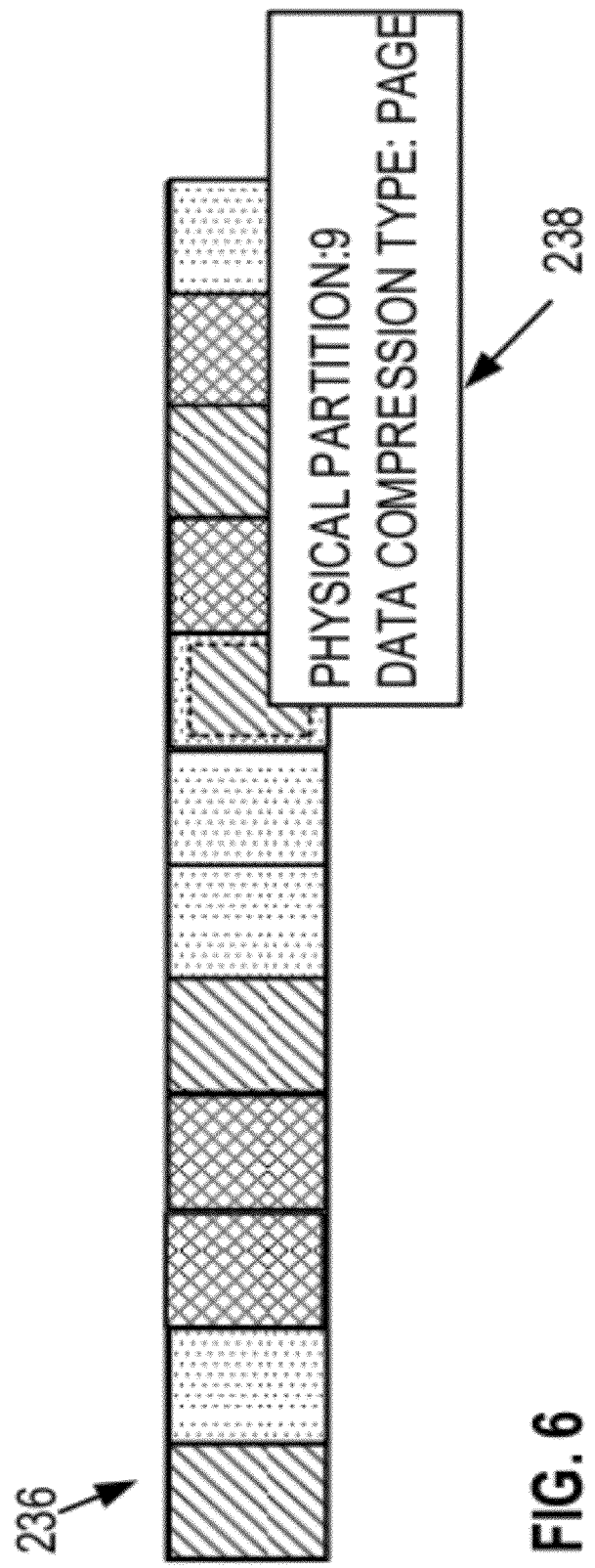
FIG. 6 is a diagrammatic view for one implementation illustrating spectrum bar control showing a tool tip.

FIG. 6 is a diagrammatic view for one implementation illustrating spectrum bar control 236 showing a tool tip 238. The tool tip 238 can display additional details about the selected data element(s), such as other data elements that were too detailed to represent graphically in the rest of the control. As described in FIG. 5, there are other ways to illustrate additional information about a selected data element than by using a tool tip 238. Tool tip 238 is just one non-limiting example.

Figure 7:
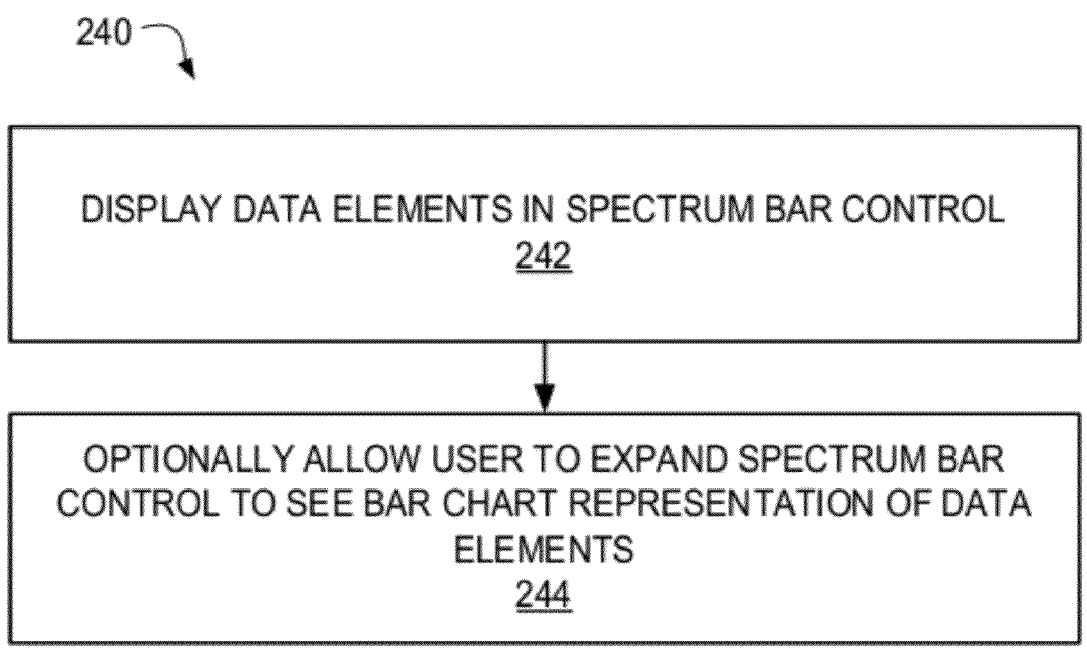
FIG. 7 is a process flow diagram for one implementation that illustrates the stages involved in allowing a spectrum bar control to show a bar chart representation of data elements.
Figure 8:
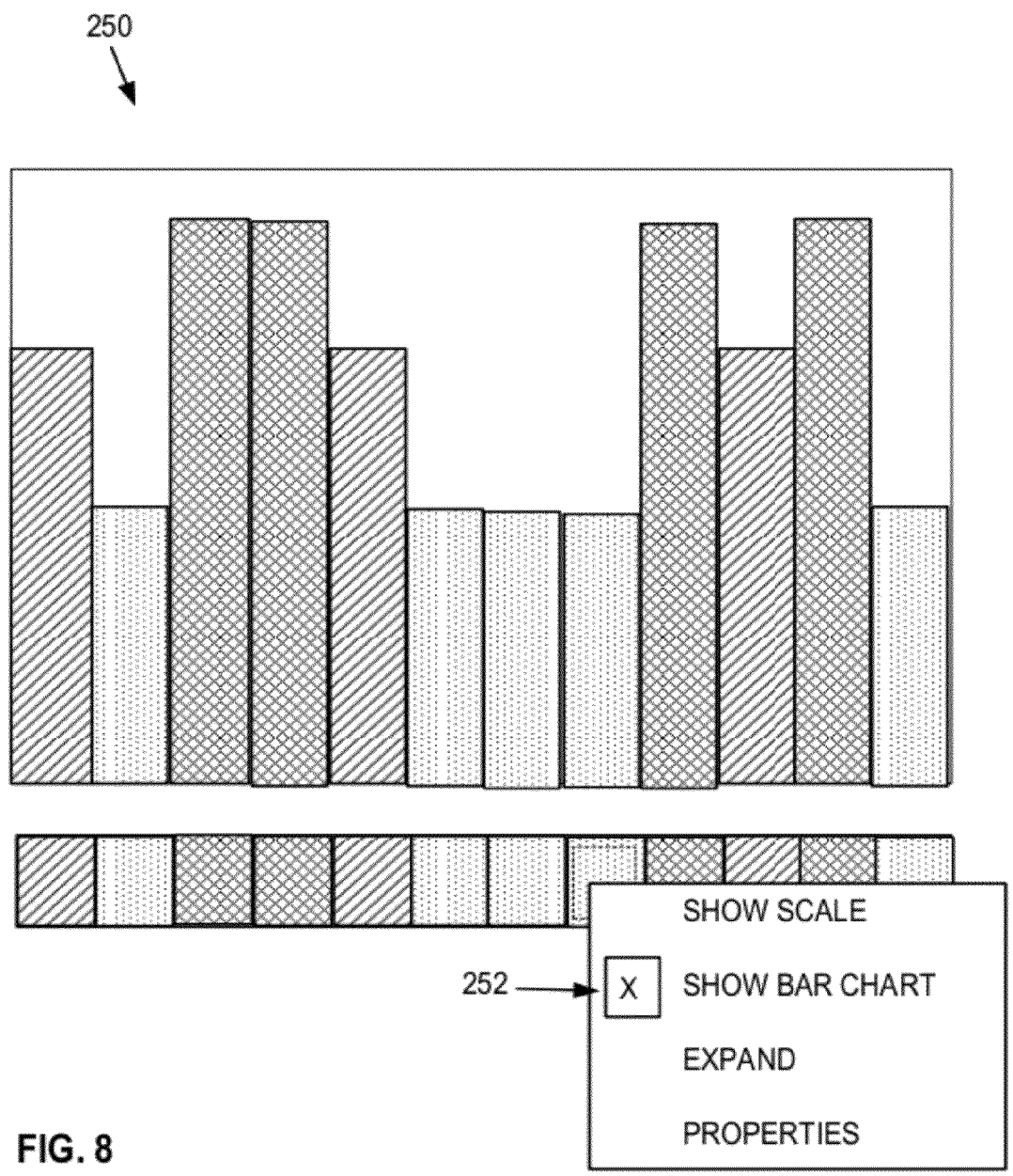
FIG. 8 is a diagrammatic view for one implementation illustrating the expansion of a spectrum bar control into a bar chart representation of data elements.

Turning now to FIGS. 7 and 8, some examples will be described for how a spectrum bar control can be expanded into a bar chart or other format for displaying even further details. FIG. 7 is a process flow diagram 240 for one implementation that illustrates the stages involved in allowing a spectrum bar control to show a bar chart representation of data elements. Data elements are displayed in the spectrum bar control (stage 242). The user can optionally expand the spectrum bar control to see a bar chart (or other) representation of the data elements (stage 244). FIG. 8 provides a diagrammatic illustration 250 of what a spectrum bar control can look like when expanded into a bar chart. In the example shown, the user selected another view of the spectrum bar from a list of available options, which in this case was "Show Bar Chart" 252. The bar chart 250 was then displayed. Numerous other ways could also be used for selecting an alternate view of the spectrum bar control when such a feature is provided, such as using keyboard shortcuts, selecting an option from a menu control, and so on.

FIG. 9 is a process flow diagram 260 for one implementation that illustrates the stages involved in allowing a user to customize how a spectrum bar control displays data. A user can customize colors displayed in the spectrum bar control for data element categories (stage 262). The customization of colors is described in further detail in FIG. 10. A user can specify filter criteria for filtering what data elements should be included in the spectrum bar control (stage 264). The filter feature is described in further detail in FIG. 11. A user can specify sort criteria that are used to sort the data elements that are displayed in the spectrum bar control (stage 266). The sort feature is described in further detail in FIG. 12. Each of these optional customization features will now be discussed in further detail.

Figure 10:
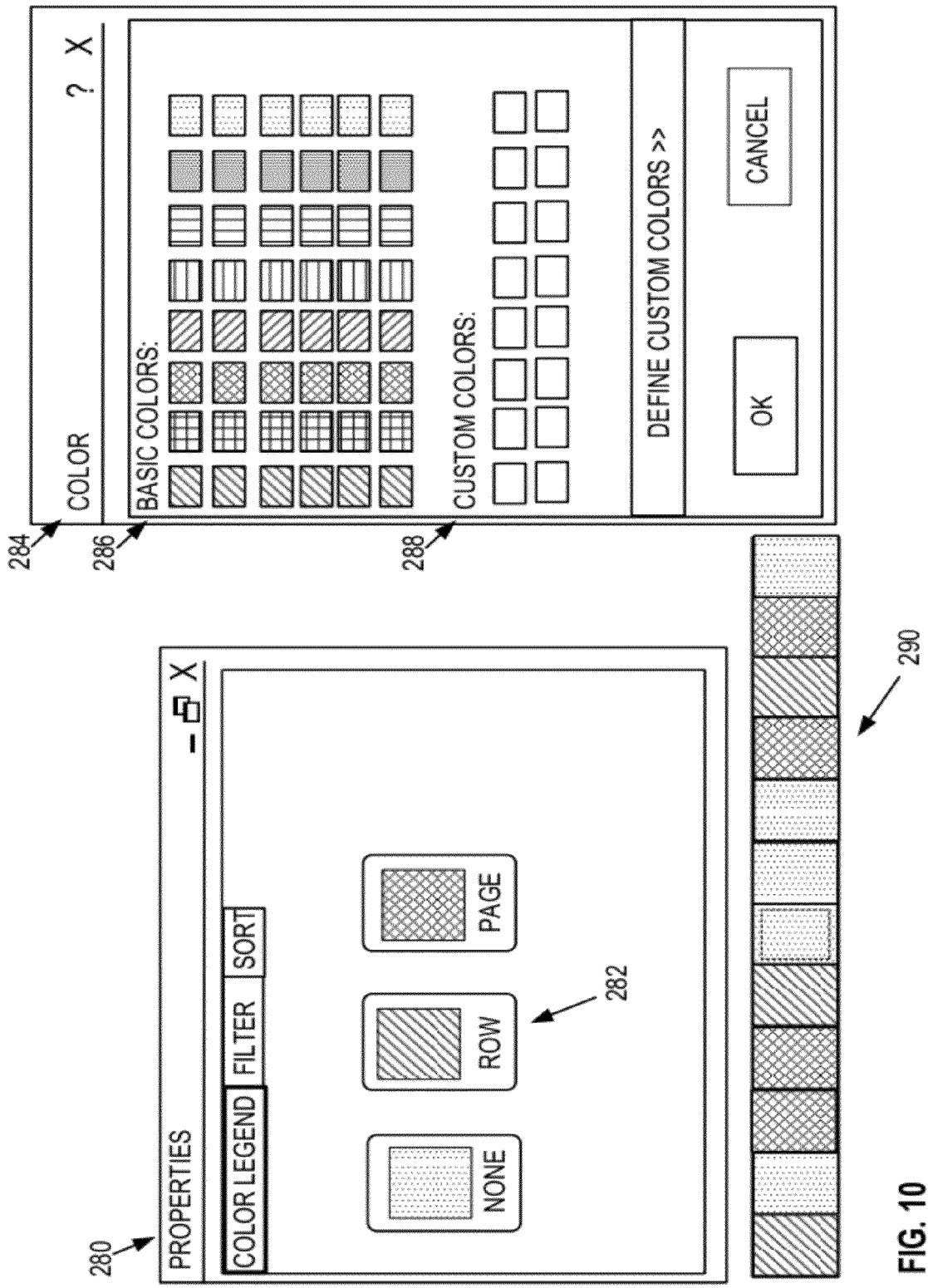
FIG. 10 simulated screens for one implementation that illustrate changing color values assigned to different data element categories in a spectrum bar control.

FIG. 10 shows simulated screens (280 and 284) for one implementation that illustrates allowing the user to change color values assigned to different data element categories in a spectrum bar control. In the simulated screens shown in FIG. 10, a color legend 280 is shown that enables the user to select which category of data 282 to apply certain color selections to. A color selection chart 284 is also shown that allows the user to associate a desired color with the selected category of data 282. Basic colors 286 and custom colors 288 are shown in FIG. 10, but any other means for allowing a user to select a color for a given category of data 282 could also be used. The spectrum bar 290 is optionally displayed along with the color legend 280 and color selection chart 284 to enable the user to make decisions more easily.

Figure 11:
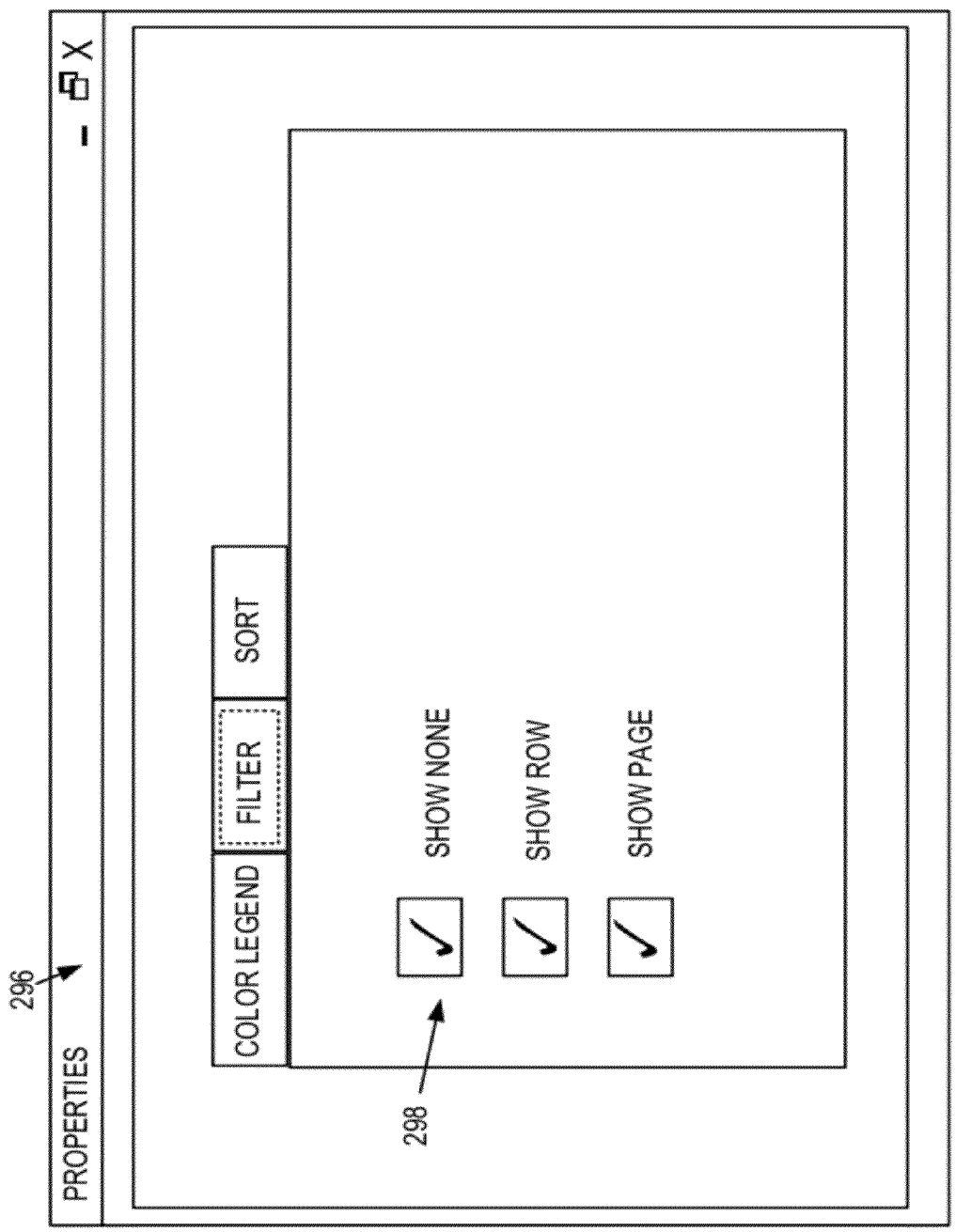
FIG. 11 is a simulated screen for one implementation that illustrates configuring filter criteria for the data element categories that are shown in a spectrum bar control.

FIG. 11 is a simulated screen 296 for one implementation that illustrates configuring filter criteria for the data element categories 298 that are shown in a spectrum bar control. In other words, the user can specify which categories of data should be included in the data represented in the spectrum bar control. This filter criteria feature can optionally enable the user to specify additional filter criteria beyond just which categories of data to include. For example, the user can optionally be presented with an option to specify more complex criteria, such as "only songs that are longer than 3 minutes in length", or "only files that are bigger than 1 Meg in size". Numerous other formats can be used for enabling the user to specify filter criteria that can alter what data gets displayed in the spectrum bar control. Similarly, the user can specify sort criteria, as described in FIG. 12.

Figure 12:
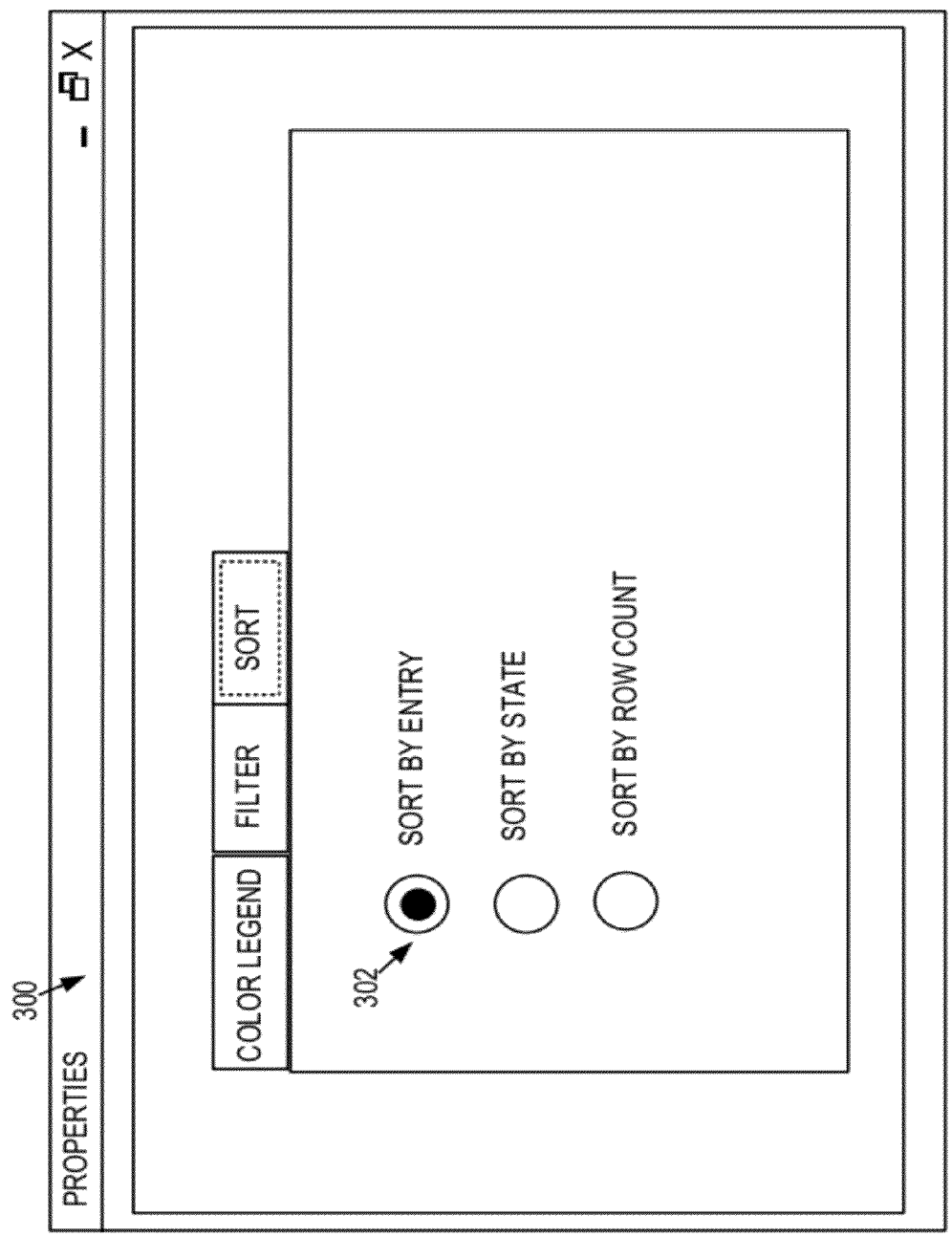
FIG. 12 is a simulated screen for one implementation that illustrates configuring sort criteria for the data element categories that are shown in a spectrum bar control.

FIG. 12 is a simulated screen 300 for one implementation that illustrates configuring sort criteria for the data element categories that are shown in a spectrum bar control. The sort criteria feature enables the user to specify how the data in the spectrum bar control should be sorted. In one implementation, default sorting can be set to the order in which data was sent to the spectrum bar control. In the example shown in FIG. 12, sort options 302 include "sort by entry", "sort by state", and "sort by row count". These are just examples for one implementation based upon a certain type of data being represented. Various other sort criteria names and options could be used based upon the nature of the data being represented in the spectrum bar control.

Figure 13:
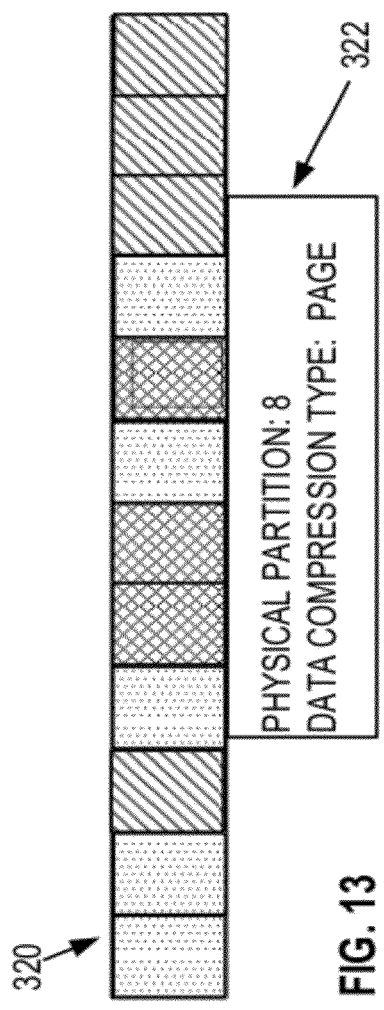
FIG. 13 is a diagrammatic view for one implementation illustrating user navigation of a spectrum bar control using keyboard commands when a small data set is present.
Figure 14:
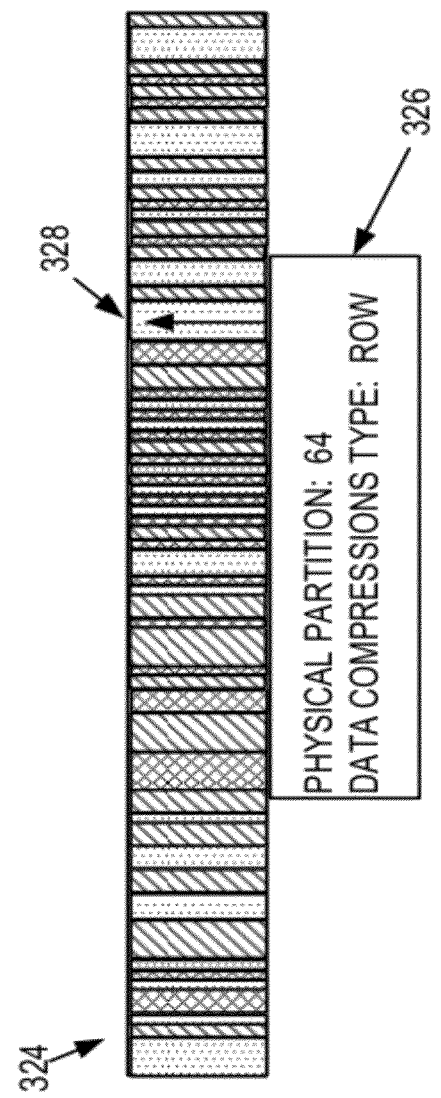
FIG. 14 is a diagrammatic view for one implementation illustrating user navigation of a spectrum bar control using keyboard commands when a large data set is present.

Turning now to FIGS. 13 and 14, examples of how a keyboard can be used to navigate a spectrum bar control are described. FIG. 13 is a diagrammatic view for one implementation illustrating user navigation of a spectrum bar control 320 using keyboard commands when a small data set is present. In one implementation, once the spectrum bar control is in a selected state, the user can navigate through the control using keyboard commands, such as left arrow and right arrow, and so on. In one implementation, the user can perform all of the same actions with a keyboard command as they can with an input device such as a mouse. In another implementation, only certain actions can be performed with one or more keyboard commands.

In the example shown in FIG. 13, a small data set is being displayed in the control. The user has selected an option to display additional details about a selected data element. The tool tip 322 is displayed at the bottom center of the control in this example, but it could be displayed in other locations in alternate implementations. Similarly, FIG. 14 also shows a tool tip 326 at the bottom center of spectrum bar control 324, which could also be displayed in other locations. FIG. 14 is an example of using keyboard navigation with a large data set. In the example shown in FIG. 14, a vertical arrow 328 appears in the zone of the selected data to visually represent what data is being represented with the tool tip 326.

Figure 15:
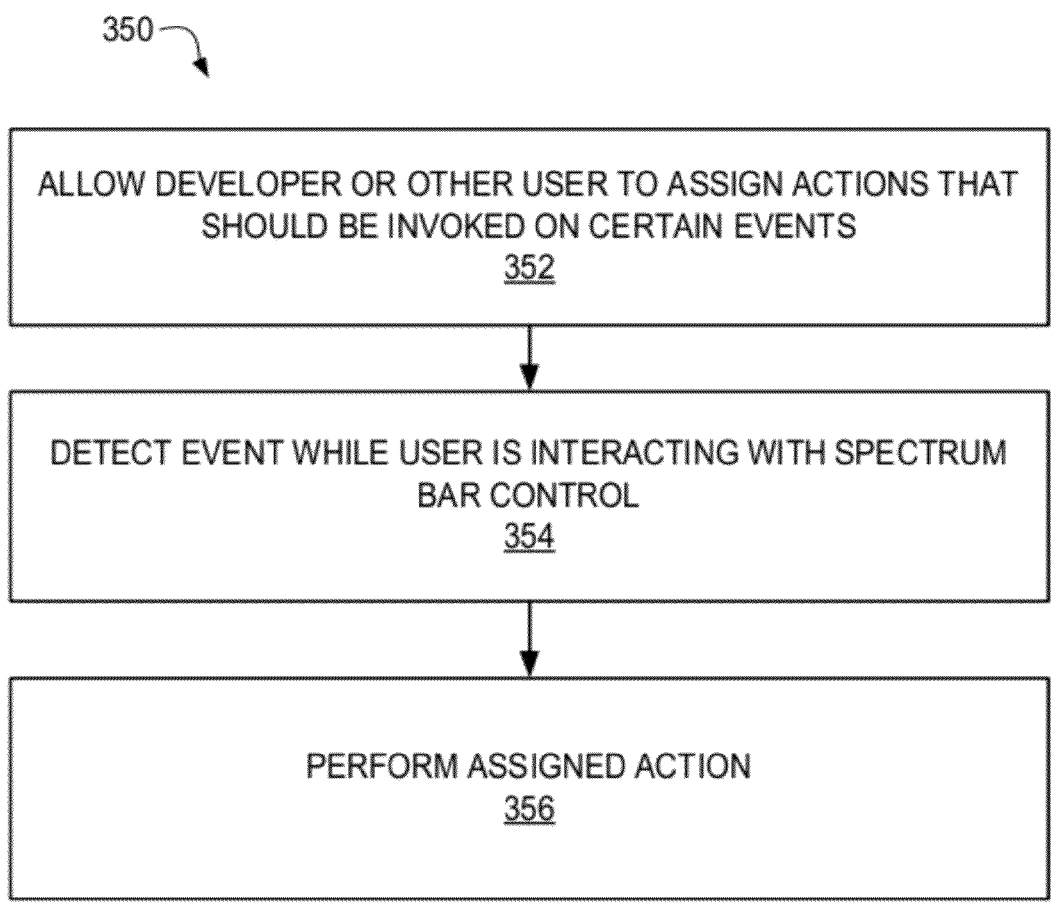
FIG. 15 is a process flow diagram for one implementation that illustrates the stages involved in allowing a developer or other user to customize actions that can be performed on a spectrum bar control.

FIG. 15 is a process flow diagram 350 for one implementation that illustrates the stages involved in allowing a developer or other user to customize actions that can be performed on a spectrum bar control. A developer or other user can assign these custom actions that should be invoked on certain events (stage 352). A few non-limiting examples of custom actions can include opening a file that is represented by a selected data element in the spectrum bar control, launching an external program that has been associated with a data element selected in the spectrum bar control, etc.

In one implementation, these custom actions are assigned at design time by a developer. In another implementation, users can customize these custom actions at run-time by a user-definable setting or other means. Once the custom action has been assigned, the control then operates as it normally would. If and when the special event that is supposed to cause the custom action is triggered and caught by the spectrum bar control (stage 354), then the spectrum bar control performs the assigned action (stage 356). Numerous other variations can also be used for implementing custom actions than just the few examples discussed herein.

Figure 16:
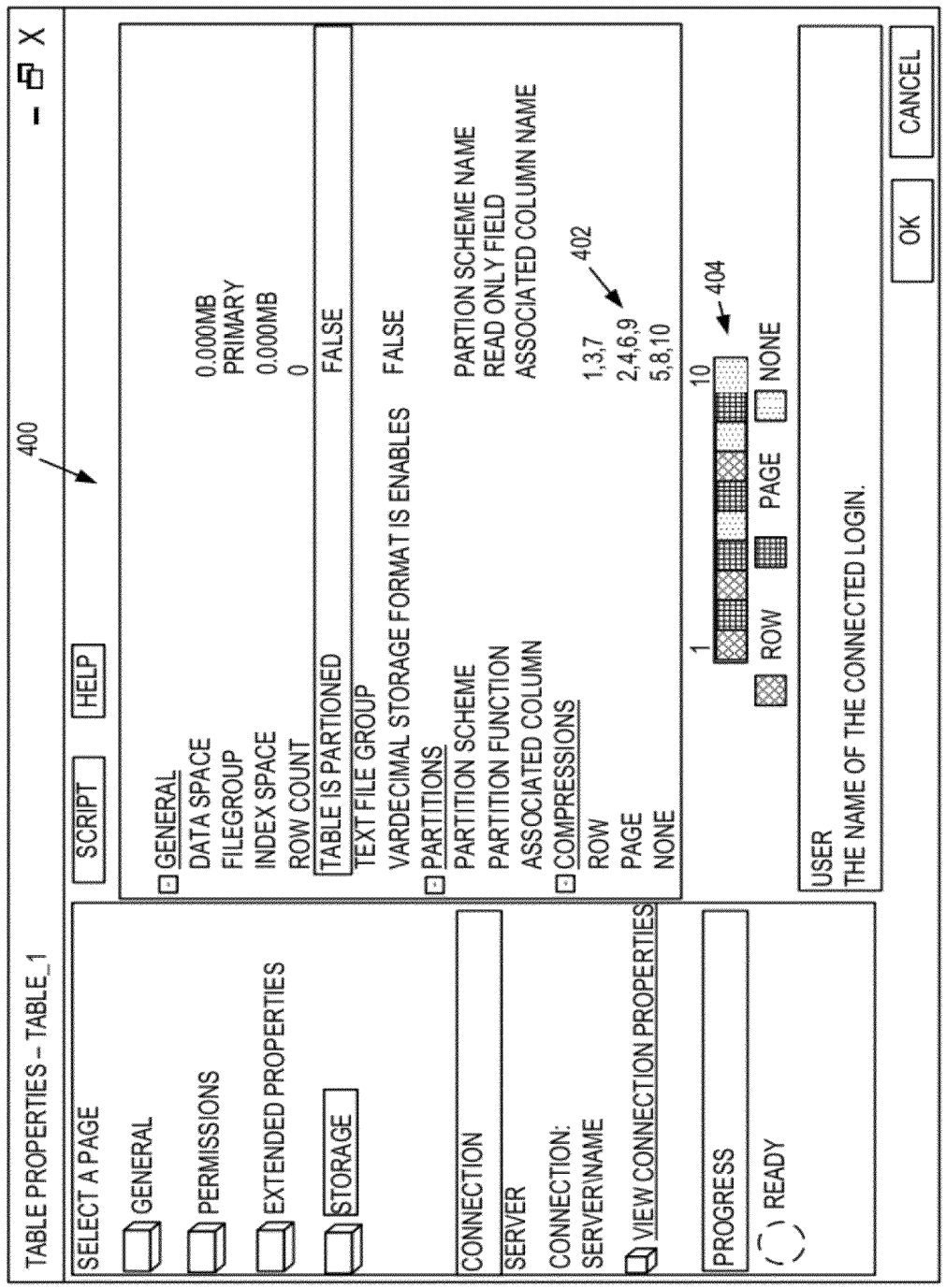
FIG. 16 is a simulated screen for one implementation that illustrates an exemplary usage of a spectrum bar control to show complex table properties of a database table.

FIG. 16 is a simulated screen 400 for one implementation that illustrates an exemplary usage of a spectrum bar control to show complex table properties of a database table. The simulated screen shown in FIG. 16 could be used with a database such as MICROSOFT® SQL Server for displaying details about the properties of a given database table. As background, database tables can be very large in size, especially in enterprise-wide applications that have thousands or even millions of records. The spectrum bar control enables multiple dimensions of such a complex data set to be displayed in a small amount of space. For example, the spectrum bar control 404 shown in FIG. 16 represents the row compression, page compression, and no compression as the possible types of categories 402. The spectrum bar control 404 graphically illustrates that data elements 1, 3, and 7 use row compression, that data elements 2, 4, 6, and 9 use page compression, and that data elements 5, 8, and 10 use no compression.

Figure 17:
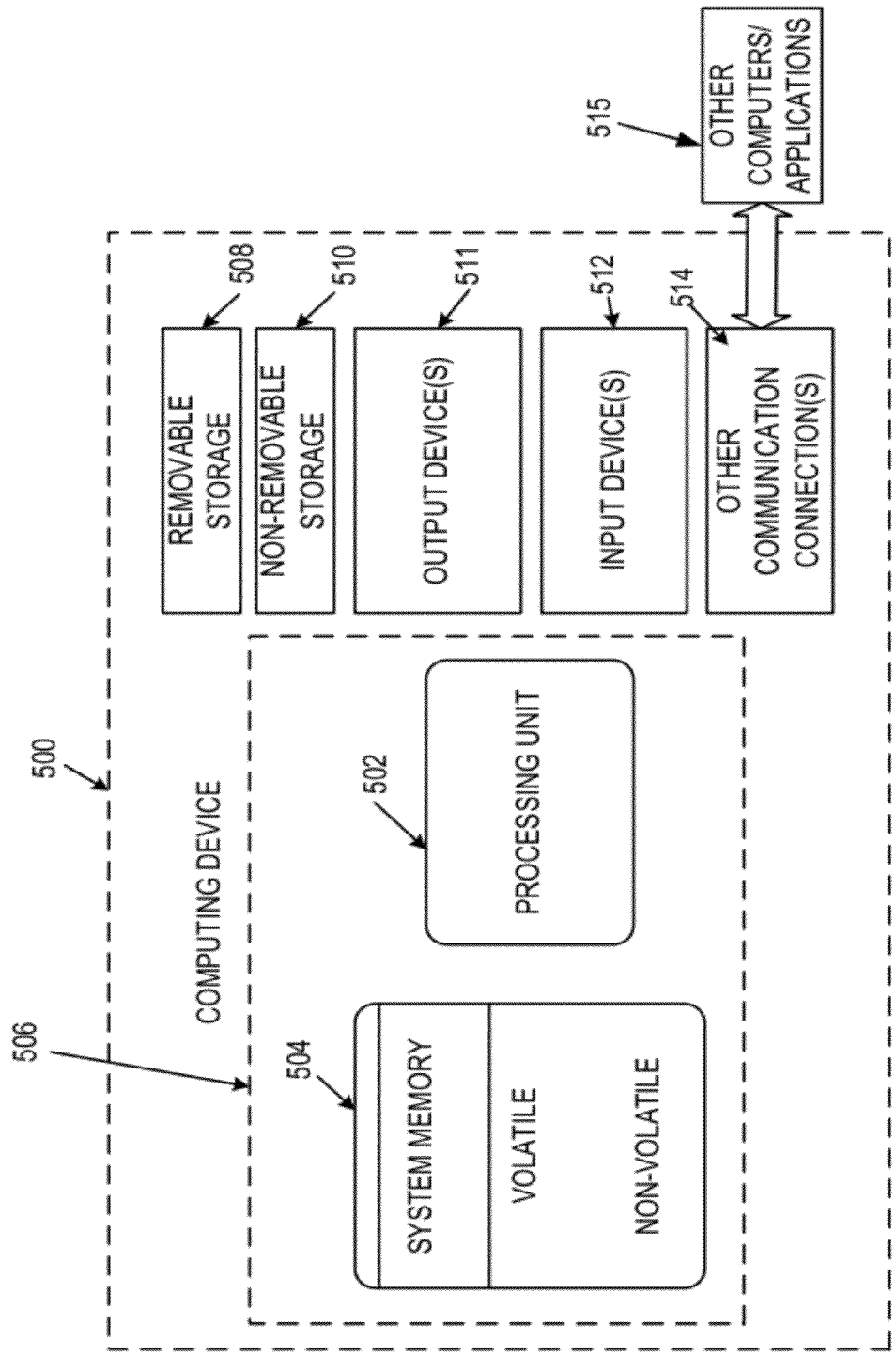
FIG. 17 is a diagrammatic view of a computer system of one implementation.

As shown in FIG. 17, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 17 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 17 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer-readable storage medium having computer-executable components comprising:
 a graphical user interface control located within a window that is operable to switch between a statistical view of data and a discrete view of the data while maintaining a same size of the graphical user interface control;
 at least one of a plurality of data elements is displayed in the statistical view having a different size than at least one other of the plurality of data elements being displayed in the statistical view; and
 the switch between the statistical view and the discrete view is performed dynamically based upon a data set size of the data.

2. The computer-readable storage medium of claim 1, wherein the graphical user interface control displays the data in a form of a spectrum bar.

3. The computer-readable storage medium of claim 2, wherein the graphical user interface control is further operable to display each category of the data in a different color in the spectrum bar.

4. The computer-readable storage medium of claim 1, wherein the graphical user interface control is further operable to display a multi-dimensional view of the data.

5. The computer-readable storage medium of claim 1, wherein the graphical user interface control is further operable to allow a user to navigate through the statistical view of the data.

6. The computer-readable storage medium of claim 5, wherein the graphical user interface control is further operable to allow the user to view additional details about the data while navigating through the statistical view of the data.

7. The computer-readable storage medium of claim 6, wherein the additional details are displayed in the form of a tool tip.

8. A computer-readable storage medium having computer-executable components comprising:
 a graphical user interface control that is operable to display data in a spectrum bar located within the graphical user interface control for a plurality of data elements with different colors being used to represent different categories of the data elements, the spectrum bar displaying the plurality of data elements in a single row, the spectrum bar being operable to switch between a statistical view of data and a discrete view of the data while maintaining a same size of the spectrum bar, and at least one of the plurality of data elements being displayed in the statistical view having a different size than at least one other of the plurality of data elements being displayed in the statistical view; and
 the switch between the statistical view and the discrete view is performed dynamically based upon a data set size of the data.

9. The computer-readable storage medium of claim 8, wherein the graphical user interface control is further operable to display multiple dimensions of the data in the spectrum bar.

10. The computer-readable storage medium of claim 9, wherein one dimension of the data is represented by the different colors.

11. The computer-readable storage medium of claim 10, wherein another dimension of the data is represented by position of the data within the spectrum bar.

12. The computer-readable storage medium of claim 8, wherein the graphical user interface control is operable to allow a user to expand the spectrum bar into a bar chart representation of the data.

13. The computer-readable storage medium of claim 8, wherein the graphical user interface control is operable to allow one or more custom actions to be assigned to the data.

14. The computer-readable storage medium of claim 13, wherein the one or more custom actions can be specified by a developer at design time.

15. The computer-readable storage medium of claim 13, wherein the one or more custom actions can be specified by a user at run-time.

16. The computer-readable storage medium of claim 8, wherein the data is database table compression data.

17. A method for providing a graphical user interface control that displays multiple dimensions of data in a small space comprising the steps of:
    displaying a plurality of dimensions of data elements in a spectrum bar control located within the graphical user interface control, with a first dimension of the data elements being visually represented by different colors used for each category of the data elements, with a second dimension of the data elements being visually represented by a position of the data elements within the spectrum bar control, and with a third dimension of the data elements being visually represented by a physical size of the data elements as shown in the spectrum bar control, the spectrum bar control displaying the plurality of dimensions of data elements in a single row, the spectrum bar control being operable to switch between a statistical view of the data and a discrete view of the data while maintaining a same size of the spectrum bar control, and at least one of the data elements being displayed in the statistical view having a different size than at least one other of the data elements being displayed in the statistical view; and
    dynamically switching between the statistical view and the discrete view based upon a data set size of the data.

18. The method of claim 17, wherein the different colors used for each category of the data elements can be customized by a user.

19. A computer-readable storage medium having computer-executable components comprising:
    a graphical user interface control that is operable to display data in a spectrum bar for a plurality of data elements with different colors being used to represent different categories of the data elements, wherein the data is database table compression data.

* * * * *